June 26, 1956 — W. H. HARRISON — 2,751,826
COLOR STEREO SYSTEM AND ATTACHMENT
Filed March 23, 1953
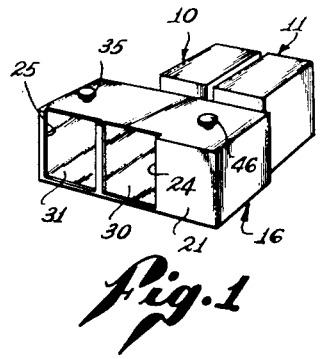
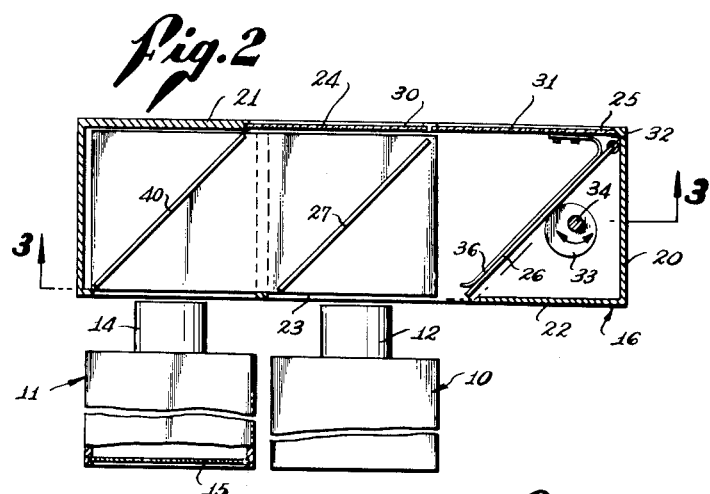
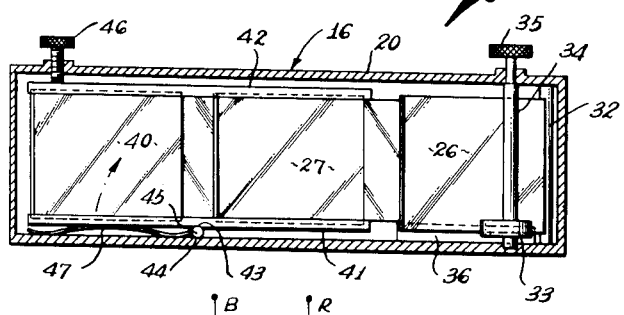
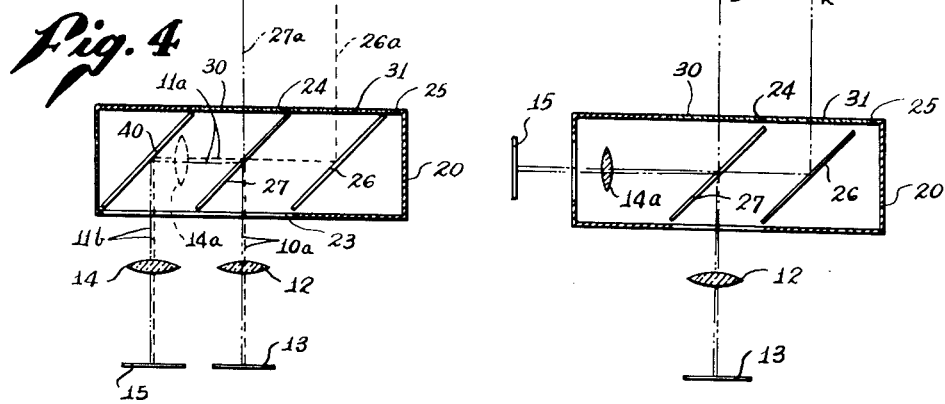
INVENTOR.
WILLIAM H. HARRISON
BY
Fulwider, Mattingly, & Babcock
Attorneys United States Patent Office 2,751,826
Patented June 26, 1956

2,751,826

COLOR STEREO SYSTEM AND ATTACHMENT

William H. Harrison, Los Angeles, Calif.

Application March 23, 1953, Serial No. 344,006

7 Claims. (Cl. 95—18)

My invention relates generally to stereoscopic apparatus for cameras, and more particularly to a device for producing stereoscopically related images within a camera, and simultaneously producing stereoscopically related images in a so-called view finder that may be observed by the operator during the taking of the pictures.

In my previous Patent, No. 2,360,322, issued October 17, 1944, and entitled "Apparatus for Producing Stereoscopic Pictures in Color," I have disclosed a device intended for attachment to a more or less conventional camera, having a single lens. This previously disclosed apparatus includes an attachment that fits over the lens of the camera and has an aperture in the rear wall aligned with the lens. In the forward wall of the apparatus are a pair of apertures, horizontally separated, and one provided with, for example, a blue-green filter, and the other aperture provided with, for example, an orange-red filter. One of the apertures in the forward wall is substantially aligned with the aperture in the rear wall, and the other aperture is horizontally offset from the rear aperture. Light passing through the offset aperture is reflected from a mirror so that the reflected light travels in a direction generally perpendicular to its original path, toward the aligned aperture. Behind the aligned aperture is a semi-reflecting mirror that transmits a substantial portion of the light passing through the aligned aperture, but also reflects the previously reflected light from the offset aperture. In this way, light from both the aligned and offset apertures passes rearwardly through the rear aperture and into the camera lens, where it is focused onto color sensitive films or emulsions in the focal plane.

While the device disclosed in my aforesaid Patent No. 2,360,322 is very satisfactory, I have now developed certain improvements which produce an even better picture, and extend the field of usefulness of my device. For example, in motion picture and television work, it is most important that the operator of the camera be able at all times to see the scene as it is being recorded by the camera. Consequently, I have developed an improved finder that enables the operator to see precisely the same image that is being recorded in the camera. Additionally, I have provided adjustable features that permit the quality of the image to be improved.

It is therefore a major object of my invention to provide a stereoscopic attachment for cameras, having a novel view finder incorporated therein;

Another object of my invention is to provide such an attachment in which the view finder can be used to indicate the relationship and alignment of the sereoscopic related images, as well as being used to produce the true stereoscopic illusion of depth, such as the resulting picture will have when viewed in the intended manner;

It is a further object of my invention to provide a stereoscopic attachment for cameras in which the two stereoscopically related images may be adjusted relative to each other in both horizontal and vertical directions.

Still another object of my invention is to provide a stereoscopic attachment adapted to produce images, that when viewed in the intended manner with each eye seeing only its corresponding image, produce a true stereoscopic effect, but when viewed so that both eyes simultaneously see both images, very acceptable and satisfactory results are obtained.

It is a still further object of my invention to provide such a device that may quickly and easily be attached to existing cameras, and in the case of still and motion picture cameras, may be used with any of a number of color responsive films and emulsions.

These and other objects and advantages will become apparent from the following description of preferred and alternate forms thereof, and from the drawings illustrating those forms in which:

Figure 1 is a perspective view of a preferred form of my device as it appears applied to a camera;

Figure 2 is a sectional plan view of the preferred form of my device;

Figure 3 is a sectional view taken on the line 3—3 of Figure 2;

Figure 4 is a simplified optical diagram of the preferred form of my invention; and Figure 5 is a simplified optical view of an alternate form of my invention.

Referring now to the drawings and particularly to Figures 1 to 4 thereof, the numeral 10 indicates generally a camera of any suitable type, having a view finder 11 attached thereto along one side. The camera 10 may be a motion picture camera, a still camera, a television camera, or other suitable form of device. As is customary, the camera 10 is provided with a lens 12 adapted to form an image upon a light sensitive surface 13, and the view finder 11 is likewise provided with a generally similar lens 14 adapted to form an image upon a viewing surface such as a ground glass 15.

Attached to the camera 10 is my improved stereo attachment 16 which includes a housing 20, preferably of a light-weight metal, and having a plurality of apertures in its forward wall 21. The opposite or rear wall 22 of the housing 20 is provided with an aperture 23 adapted to be aligned with the camera lens 12, and an aperture 24 in the forward wall, hereinafter referred to as the "aligned aperture," is in substantial alignment with the aperture 23. Adjacent the aligned aperture 24, but displaced horizontally therefrom is a second aperture 25 in the forward wall, hereinafter referred to as the "offset aperture."

Within the housing 20 and rearwardly of the offset aperture 25, I mount an angularly positioned mirror 26, mounted in a substantially vertical plane that makes an angle of approximately 45° with the optical axis of the lens 12.

Within the housing 20 and rearwardly of the aperture 24 is a second mirror 27 substantially parallel to the first mirror 26, and so aligned with the first mirror that light entering the offset aperture 25 and reflected from the first mirror 26 is reflected from the second mirror 27 into the camera lens 12. However, where the first mirror 26 is fully reflecting, i. e., the maximum reflection and minimum transmission obtainable is desired, the second mirror 27 is a semi-transparent, semi-reflecting mirror, i. e., one reflecting approximately half the incident light and transmitting approximately half of the incident light. Because of this characteristic of the second mirror 27, some of the light entering the aperture 24 will pass through the mirror 27 into the camera lens 12. In the aperture 24 I place a color filter 30, such as a blue-green filter, and in the aperture 25, I place another filter 31, such as an orange-red filter. The light rays passing through the aperture 24 are thus restricted to the blue-green range, while those passing through the aperture 25 are restricted to the orange-red range. The filters 30 and 31 are selected so that they divide the spectrum in substantially two equal halves, and the images or light rays passing these respective filters can be separately recorded upon different color discriminating emulsions. For example, the two images may be focused by the lens 12 upon a suitable color film of the monopack type, of which several are commercially available, or the image may be formed upon emulsions carried by two separate film bases, placed face-to-face, and known as bipack. The blue-green image from the aperture 24 will be slightly different from the orange-red image from the aperture 25, and though the images may be caused to register at certain points, the entire scene cannot be in register if various portions of the subject are at different distances from the camera. As is well known, it is these slight differences that produce binocular or stereoscopic vision.

As is well known, binocular vision is accompanied by two separate actions of the eyes. In the first action, the eyes focus upon the principal subject, and though other objects are behind the principal subject, or between it and the observer, these other objects are more or less out of focus. The second action that takes place is that of convergence, where the eyes turn inwardly a greater or lesser extent so that their optical axis intercept at the principal subject. In the case of extremely distant objects, the optical axis of the two eyes may be considered as being parallel to each other.

If the first mirror 26 is parallel to the second mirror 27, the "lines of sight" will be parallel to each other, and thus the device may be considered as set for an object located an infinite distance away. Thus, in Figure 4, the line of sight, 26a from the mirror 26 is parallel to the line of sight 27a from the mirror 27. If the lines of sight 26a and 27a are close to each other, the images formed thereby will be very similar, and in many instances will be undetected. However, as the horizontal separation between the apertures 24 and 25, and hence, between the mirrors 26 and 27, is increased, the differences between the two images become more pronounced. To achieve the proper illusion, it is desirable to have the line of sight 26a converge toward the line of sight 27a, the two meeting at the principal subject. One of the simplest methods of doing this is to mount the mirror 26 so that it may be rotated about a vertical axis, and while many methods may be used for this, I have found one of the simplest to be of the type illustrated in Figures 2 and 3.

The mirror 26 is itself a rigid member or is mounted upon a rigid member which in turn is supported upon a vertically extending shaft 32 mounted in the housing 20. The angle between the first mirror 26 and the second mirror 27 can thus be changed by rotating the first mirror about the axis of the shaft 32, and I prefer to accomplish this by means such as a cam 33 that bears against the rear surface of the mirror 26 and is carried by a second vertically extending shaft 34. The second shaft 34 is mounted in the housing 20 and projects through the latter to receive an adjusting knob 35 that is firmly attached to the shaft. The cam 33 is likewise anchored to the shaft 34, and thus rotation of the adjusting knob 35 will cause the cam 33 to be turned, swinging the mirror 26 about the axis of the first vertical shaft 32. To hold the mirror 26 firmly against cam 33 at all times, I provide spring means such as a leaf spring 36 that has one end anchored to the interior of the housing 20 and the other end positioned to bear against the forward surface of the mirror 26.

In order to determine when the lines of sight 26a and 27a converge upon the principal subject, it is very desirable to be able to view the composite of the images to check their registration. This composite image, focused by the lens 12 appears upon the photo-sensitive surface 13, but it is clearly inconvenient to have to remove the camera and substitute a ground glass and viewing lens in order to check the alignment. This becomes particularly burdensome and inconvenient when, in the case of motion picture cameras and television cameras, the principal subject is moving toward or away from the camera, and the convergence of the lines of sight 26a and 27a must be continuously varied.

To overcome these difficulties, I have provided a view finder that permits the composite image to be continuously observed while the same image is being recorded upon the photo-sensitive emulsion or surface 13. In so doing, I make use of the fact that the second mirror 27 is a semi-transparent mirror, as well as being semi-reflecting, and thus provide a beam of light substantially perpendicular to that passing through the lens 12 of the camera 10. It will be recalled that the mirror 26 is substantially opaque and reflects substantially all of the light falling upon it. This light reflected from the first, totally reflecting, mirror 26 is directed to the semi-transparent mirror 27, and a portion of this light is again reflected to pass through the camera lens 12. However, not all of the light from the mirror 26 is reflected by the mirror 27, but instead only approximately 50 percent thereof. The remainder of the light passes through the second mirror 27, and continues on, in a direction away from the first mirror 26.

Similarly, light from the aperture 24, indicated generally by the line of sight 27a strikes the semi-reflecting mirror 27, and a portion of this light is transmitted through the mirror to pass through the camera lens 12 and fall upon the photo-sensitive surface 13. The portion of the light that is not transmitted by the semi-reflecting mirror 27 is reflected therefrom, in the same general manner that light is reflected from the first mirror 26, and this reflected light is directed away from the first mirror 26, in a direction substantially parallel to the light reflected from the mirror 26 and transmitted from the semi-reflecting mirror 27. Thus, if the filter 30 in the aperture 24 transmits blue-green light, the line of sight may be considered as a blue beam, while the line of sight 26a may be considered as a red beam, since the filter 31 transmits orange-red light. Red light is thus reflected from the first mirror 26, its path being indicated by the dotted line in Figure 4, and a portion of this red light is reflected by the semi-reflecting mirror 27 to pass through the lens 12 of the camera. The remainder of the red light is transmitted through the mirror 27 for use in the view finder. Similarly, the blue-green light, indicated by the dot-dash line in Figure 4, is partially transmitted by the semi-reflecting mirror 27, and the light thus transmitted also passes through the camera lens 12. The blue light that is reflected by the semi-transparent mirror 27 passes in a direction parallel to the transmitted red beam, and the reflected blue beam is thus also available for use in the view finder.

The red and blue beams that are directed through the camera lens 12 may be termed the camera beams 10a, and the red and blue beams that are to be used in the view finder may be considered as the finder beams 11a. The camera beams 10a are substantially perpendicular, as indicated in Figure 4, to the finder beams 11a, but it is usually more convenient to have the view finder 11 positioned so that the operator in the rear of the camera 10 and facing the subject, may view the image appearing in the view finder 11. Consequently, I have provided a third or finder mirror 40 parallel to the second or semi-transparent mirror 27, and acting to reflect the finder beams 11a in a direction substantially parallel to the camera beams 10a. The reflected finder beams are designated by the numeral 11b. The finder mirror 40, like the first mirror 26, is a totally reflecting mirror, and is rigidly mounted so that it remains parallel with the second, semi-transparent mirror 27, at all times. The finder beams 11b are directed through a finder lens 14 which forms an image, or a pair of images, upon a viewing screen 15. Depending upon the focal length of the lens 14, which preferably should be the same as the focal length as the camera lens 12, and upon other optical requirements, the lens 14 may be positioned between the semi-transparent mirror 27 and the finder mirror 40, as indicated by the numeral 14a in Figure 4.

Occasionally, because of misalignment of the optical elements, or because of the peculiar conditions existing at the time, the red and blue images, while horizontally aligned, will not be vertically aligned, either upon the photo-sensitive surface 13 or upon the viewing screen 15. While this does not occur often, I have made provision for securing the vertical alignment of these images. This is accomplished by rotating the semi-transparent mirror 27 about a substantially horizontal axis, and since the viewing mirror 40 is parallel to the semi-transparent mirror 27 at all times, the viewing mirror is likewise rotated about this axis. One method of so mounting the mirrors is best illustrated in Figure 3, where it is seen that the semi-transparent mirror 27 and the finder mirror 40 are rigidly held between a lower plate 41 and an upper plate 42. The mirrors 27 and 40 and the plates 41 and 42 are so attached and anchored to each other that no relative motion takes place between any two of the members.

Substantially midway between the semi-reflecting mirror 27 and the finder mirror 40, I provide a groove 43 in the lower surface of the lower plate 41, and a corresponding groove 44 in the upper surface of the housing 20, aligned with the groove 43. The grooves 43 and 44 are parallel to each other and to the line of sight 27a, and a rod or roller 44 is placed in the grooves so that the lower plate 41 and the mirrors 27 and 40, as well as the upper plate 42, may all rock back and forth about the substantially horizontal axis of the rod 45. To adjust the position of the mirrors 27 and 40, I provide a thumb screw 46 that projects through the upper portion of the housing 20 and bears against the upper surface of the upper plate 42 at one end thereof. Resilient means, such as a leaf spring 47, is placed between the lower surface of the lower plate 41 and the upper surface of the bottom of the housing, beneath the thumb screw 46, so that the spring 47 urges the plates 41 and 42 in a clockwise direction, as seen in Figure 3, while the thumb screw 46 may be turned to force the plates in a counter-clockwise direction.

The operation of the means for vertically aligning the red and blue images will become apparent when it is realized that rotation of the semi-reflecting mirror 27 about a horizontal axis, in a clockwise direction as seen in Figure 3, will cause the red image appearing upon the photo-sensitive surface 13 to be displaced downwardly with respect to the blue image appearing thereon. At the same time, the red image reflected on to the viewing mirror 40 will remain stationary, while the blue image will be directed upwardly. Thus, the different images move in opposite directions upon the different screens.

Where it is preferable to have the viewing screen 15 located in a plane perpendicular to the photo-sensitive surface 13, the finder mirror 40 may be omitted, and the viewing screen may be positioned at one end of the housing 20, as indicated generally in Figure 5. In all other respects, the operation of this modified form is similar to that of the previously described form.

Two different and important effects are possible when using my improved stereoscopic apparatus as a finder. The first effect has already been discussed, and is secured when the image appearing upon the viewing screen 15 is viewed in a normal manner, without filters before the eyes of the observer. Under these conditions, the observer sees two separate images, one red and one blue, and the amount by which these two images are out of register may be readily observed. Furthermore, the portion of the subject upon which the lines of sight 26a and 27a converge may be determined, since this particular portion of the composite image will be in register, and the red and blue images will coincide. By continuously observing the composite image as the action progresses, the operator may position the first, fully reflecting mirror 26 so that the lines of sight 26a and 27a converge upon the principal subject matter at all times. It is thus possible to follow the action and keep the principal subject matter at the point of convergence regardless of movement taking place.

The second effect is obtained when the observer or operator views the composite image appearing upon the viewing screen 15 through viewing filters similar to those used by the ultimate viewers of the finished product. Thus, with the line of sight 27a, corresponding to the left eye images, passing through a blue filter, while the line of sight 26a, corresponding to the right eye, passes through a red filter, the observer or operator may view the image upon the viewing screen 15 through spectacles having a blue filter before the left eye, and a red filter before the right eye. Each eye then sees the corresponding images in their normal relationship, and the stereoscopic effect is obtained. The operator thus sees the images as the final observers will see them, and the extent of the stereoscopic effect, the composition of the scene, and other matters may be seen and considered as the taking operation proceeds.

From the foregoing, it will be seen that I have provided a new and unique stereoscopic apparatus and finder fully capable of achieving the objects and securing the results heretofore set forth. While I have shown and described preferred and optional forms of my invention, it will be apparent that modifications may be made therein that will be immediately apparent to those skilled in the art, without departing from the broad principles herein contained. Consequently, I do not wish to be restricted to the particular form or arrangement of parts herein described and shown, except as limited by my claims.

I claim:

1. A stereoscopic device of the class described which includes: supporting means adapted to be positioned before the lens of a camera, having a pair of forward apertures, one aligned with, and one horizontally offset from, the optical axis of said lens; a reflecting member mounted in said supporting means behind said offset aperture and angularly positioned to reflect light from said offset aperture toward said optical axis; a semi-reflecting, semi-transparent means mounted in said supporting means behind said aligned aperture and with its semi-reflecting, semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; manually adjustable means for varying the angle said semi-reflecting, semi-transparent surface makes with the light reflected from said reflecting member, said angle being varied about a generally horizontal axis for varying the alignment of images formed by said surface and said member; and, means for observing the image formed by the light from said aligned aperture that is reflected by, and the light from said offset aperture that is transmitted through, said semi-reflecting, semi-transparent surface, whereby said alignment may be visually checked as said camera is operating.

2. A stereoscopic device of the class described which includes: supporting means adapted to be positioned before the lens of a camera, having a pair of forward apertures, one aligned with, and one horizontally offset from, the optical axis of said lens; a reflecting member mounted in said supporting means behind said offset aperture and angularly positioned to reflect light from said offset aperture toward said optical axis; a semi-reflecting, semi-transparent means mounted in said supporting means behind said aligned aperture and with its semi-reflecting, semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; manually adjustable means for varying the angle said reflecting member makes with said optical axis to thereby control the convergence of said reflecting member and said semi-reflecting surface; manually adjustable means for varying the angle said semi-reflecting, semi-transparent surface makes with the light reflected from said reflecting member, said angle being varied about a generally horizontal axis for changing the alignment of images formed by said surface and said member; and means for observing the image formed by the light from said aligned aperture that is reflected by, and the light from said offset aperture that is transmitted through, said semi-reflecting, semi-transparent surface, whereby said convergence and said alignment may be visually checked as said camera is operating.

3. A stereoscopic device of the class described which includes: supporting means adapted to be positioned before the lens of a camera, having a pair of forward apertures, one aligned with, and one horizontally offset from, the optical axis of said lens; a pair of mutually exclusive light filters, one placed in the path of light from said aligned aperture and the other placed in the path of light from said offset aperture; a reflecting member mounted in said supporting means behind said offset aperture and angularly positioned to reflect light from said offset aperture toward said optical axis; a semi-reflecting, semi-transparent means mounted in said supporting means behind said aligned aperture and with its semi-reflecting, semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; manually adjustable means for varying the angle said reflecting member makes with said optical axis to thereby control the convergence of said reflecting member and said semi-reflecting surface; manually adjustable means for varying the angle said semi-reflecting, semi-transparent surface makes with the light reflected from said reflecting member, said angle being varied about a generally horizontal axis for changing the vertical alignment of images formed by said surface and said member; and means for observing the image formed by the light from said aligned aperture that is reflected by, and the light from said offset aperture that is transmitted through, said semi-reflecting, semi-transparent surface, whereby said convergence and said alignment may be visually checked as said camera is operating.

4. A stereoscopic device of the class described which includes: supporting means adapted to be positioned before the lens of a camera, having a pair of forward apertures, one aligned with, and one horizontally offset from, the optical axis of said lens; a pair of mutually exclusive light filters, one placed in the path of light from said aligned aperture and the other placed in the path of light from said offset aperture; a reflecting member mounted in said supporting means behind said offset aperture and angularly positioned to reflect light from said offset aperture toward said optical axis; a semi-reflecting, semi-transparent means mounted in said supporting means behind said aligned aperture and with its semi-reflecting semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; means for rotating said reflecting member about a substantially vertical axis to vary the angle said member makes with said optical axis to thereby control the convergence of said reflecting member and said semi-reflecting surface; means for rotating said semi-reflecting, semi-transparent member about a substantially horizontal axis to vary the angle said member makes with the light reflected from said reflecting member thereby changing the vertical alignment of images formed by said surface and said member; and means for observing the image formed by the light from said aligned aperture that is reflected by, and the light from said offset aperture that is transmitted through, said semi-reflecting, semi-transparent surface, whereby said convergence and said alignment may be visually checked and adjusted as said camera is operating.

5. A stereoscopic device of the class described which includes: supporting means adapted to be positioned before the lens of a camera, having a pair of foward apertures, one aligned with, and one horizontally offset from, the optical axis of said lens; a pair of mutually exclusive light filters, one placed in the path of light from said aligned aperture and the other placed in the path of light from said offset aperture; a reflecting member mounted in said supporting means behind said offset aperture and angularly positioned to reflect light from said offset aperture toward said optical axis; a semi-reflecting, semi-transparent means mounted in said supporting means behind said aligned aperture and with its semi-reflecting, semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; means for rotating said reflecting member about a substantially vertical axis to vary the angle said member makes with said optical axis to thereby control the convergence of said reflecting member and said semi-reflecting surface; means for rotating said semi-reflecting, semi-transparent member about a substantially horizontal axis to vary the angle said member makes with the light reflected from said reflecting member thereby changing the vertical alignment of images formed by said surface and said member; and a viewing mirror substantially parallel to said semi-reflecting, semi-transparent member and movable therewith, said viewing mirror being substantially aligned with said semi-reflecting, semi-transparent member and said reflecting member and on the opposite side of said semi-reflecting, semi-transparent member from said reflecting member, whereby said convergence and said alignment may be visually checked and adjusted as said camera is operating.

6. A stereoscopic device of the class described which includes: supporting means adapted to be positioned before the lens of a camera, having a pair of forward apertures, one aligned with, and one horizontally offset from, the optical axis of said lens; a pair of mutually exclusive light filters, one placed in the path of light from said aligned aperture and the other placed in the path of light from said offset aperture; a reflecting member mounted in said supporting means behind said offset aperture and angularly positioned to reflect light from said offset aperturee toward said optical axis; a semi-reflecting, semi-transparent means mounted in said supporting means behind said aligned aperture and with its semi-reflecting, semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; means for rotating said reflecting member about a substantially vertical axis to vary the angle said member makes with said optical axis to thereby control the convergence of said reflecting member and said semi-reflecting surface; means for rotating said semi-reflecting, semi-transparent member about a substantially horizontal axis to vary the angle said member makes with the light reflected from said reflecting member thereby changing the vertical alignment of images formed by said surface and said member; lens means in the path of light emerging from said semi-reflecting, semi-transparent member substantially perpendicular to said optical axis; and means for observing the image formed by said last-mentioned lens means, whereby said convergence and said alignment may be visually checked and adjusted as said camera is operating.

7. A stereoscopic device of the class described which includes: supporting means adapted to be positioned before the lens of a camera, having a pair of forward apertures, one aligned with, and one horizontally offset from, the optical axis of said lens; a pair of mutually exclusive light filters, one placed in the path of light from said aligned aperture and the other placed in the path of light from said offset aperture; a reflecting member mounted in said supporting means behind said offset aperture and angularly positioned to reflect light from said offset aperture toward said optical axis; a semi-reflecting, semi-transparent means mounted in said supporting means behind said aligned aperture and with its semi-reflecting, semi-transparent surface at an angle to said optical axis and substantially parallel to said reflecting member, whereby approximately one-half the light from said aligned aperture is transmitted through, and approximately one-half the light from said offset aperture is reflected by said semi-reflecting, semi-transparent surface, along said optical axis toward said lens; means for rotating said reflecting member about a substantially vertical axis to vary the angle said member makes with said optical axis to thereby control the convergence of said reflecting member and said semi-reflecting surface; means for rotating said semi-reflecting, semi-transparent member about a substantially horizontal axis to vary the angle said member makes with the light reflected from said reflecting member thereby changing the vertical alignment of images formed by said surface and said member; lens means in the path of light emerging from said semi-reflecting, semi-transparent member substantially perpendicular to said optical axis; a viewing mirror substantially parallel to said semi-reflecting, semi-transparent member and movable therewith, said viewing mirror being substantially aligned with said semi-reflecting, semi-transparent member and said reflecting member and on the opposite side of said semi-reflecting, semi-transparent member from said reflecting member; and, means for observing the image formed by said last mentioned lens means, whereby said convergence and said alignment may be visually checked and adjusted as said camera is operating.

References Cited in the file of this patent
UNITED STATES PATENTS

| | | |
|---|---|---|
| 1,479,212 | Ames | Jan. 1, 1924 |
| 2,185,847 | Harrison | Jan. 2, 1940 |
| 2,360,322 | Harrison | Oct. 17, 1944 |
| 2,374,475 | Eagle | Apr. 24, 1945 |
| 2,413,996 | Ramsdell | Jan. 7, 1947 |